United States Patent [19]

Disanto et al.

[11] Patent Number: 5,304,439
[45] Date of Patent: Apr. 19, 1994

[54] METHOD OF MAKING AN ELECTROPHORETIC DISPLAY PANEL WITH INTERLEAVED LOCAL ANODE

[75] Inventors: Frank J. Disanto, North Hills; Denis A. Krusos, Lloyd Harbor; Frederic E. Schubert, Shoreham, all of N.Y.

[73] Assignee: Copytele, Inc., Huntington Station, N.Y.

[21] Appl. No.: 6,471

[22] Filed: Jan. 21, 1993

Related U.S. Application Data

[62] Division of Ser. No. 746,854, Aug. 19, 1991, Pat. No. 5,216,416.

[51] Int. Cl.⁵ ............................................. G02F 1/03
[52] U.S. Cl. ................................. 430/20; 430/312; 430/314; 430/316; 430/319; 430/329; 359/54; 359/62
[58] Field of Search .................. 430/20, 23, 312, 314, 430/316, 318, 329, 394, 319; 350/333, 334

[56] References Cited

U.S. PATENT DOCUMENTS

4,732,830  3/1988  DiSanto et al. ................... 430/312

Primary Examiner—Marion E. McCamish
Assistant Examiner—S. Rosasco
Attorney, Agent, or Firm—Arthur L. Plevy

[57] ABSTRACT

A method of manufacturing an improved an electrophoretic display having a cathode/grid/local anode matrix and a remote anode includes forming the local anode lines in the same plane as the grid lines from the same material and in the same fabricating step. The local anode lines are insulated from the grid lines and are interleaved therewith, each being formed on a common layer of photoresist. It is preferred that each grid line be associated with one local anode line, that the grid lines have tines and that the local anode lines be disposed between the tines.

13 Claims, 3 Drawing Sheets

METHOD OF MAKING AN ELECTROPHORETIC DISPLAY PANEL WITH INTERLEAVED LOCAL ANODE

This is a division of application Ser. No. 07/746,854, field Aug. 19, 1991 now U.S. Pat. No. 5,216,416.

FIELD OF THE INVENTION

The present invention relates to an electrophoretic display panel apparatus and methods for making same and, more particularly, to electrophoretic display panels with a local anode having elements which are interleaved with the grid elements of the display for assisting in the control of pigment particle migration and position.

DESCRIPTION OF THE PRIOR ART

Electrophoretic displays (EPIDS) are now well known. A variety of display types and features are taught in several patents issued in the names of the inventors herein, Frank J. DiSento and Denis A. Krusos and assigned to the assignee herein, Copytele, Inc. of Huntington Station, N.Y. For example, U.S. Pat. Nos. 4,655,897 and 4,732,830, each entitled ELECTROPHORETIC DISPLAY PANELS AND ASSOCIATED METHODS describe the basic operation and construction of an electrophoretic display. U.S. Pat. No. 4,742,345, entitled ELECTROPHORETIC DISPLAY PANELS AND METHODS THEREFOR, describes a display having improved alignment and contrast. Many other patents regarding such displays are also assigned to Copytele, Inc. One pending patent application which may have some relevance to the present invention is U.S. Pat. No. 5,053,763 entitled DUAL ANODE FLAT PANEL ELECTROPHORETIC DISPLAY APPARATUS, each of which shall be described below.

The display panels shown in the above-mentioned patents operate upon the same basic principle, viz., if a suspension of electrically charged pigment particles in a dielectric fluid is subjected to an applied electrostatic field, the pigment particles will migrate through the fluid in response to the electrostatic field. Given a substantially homogeneous suspension of particles having a pigment color different from that of the dielectric fluid, if the applied electrostatic field is localized it will cause a visually observable localized pigment particle migration. The localized pigment particle migration results either in a localized area of concentration or rarefaction of particles depending upon the sign and direction of the electrostatic field and the charge on the pigment particles. The electrophoretic display apparatus taught in the foregoing U.S. Patents are "triode-type" displays having a plurality of independent, parallel, cathode row conductor elements or "lines" deposited in the horizontal on one surface of a glass viewing screen. A layer of insulating photoresist material deposited over the cathode elements and photoetched down to the cathode elements to yield a plurality of insulator strips positioned at right angles to the cathode elements, forms the substrate for a plurality of independent, parallel column or grid conductor elements or "lines" running in the vertical direction. A glass cap member forms a fluid-tight seal with the viewing window along the cap's peripheral edge for containing the fluid suspension and also acts as a substrate for an anode plate deposited on the interior flat surface of the cap. When the cap is in place, the anode surface is in spaced parallel relation to both the cathode elements and the grid elements. Given a specific particulate suspension, the sign of the electrostatic charge which will attract and repel the pigment particles will be known. The cathode element voltage, the anode voltage, and the grid element voltage can then be ascertained such that when a particular voltage is applied to the cathode and another voltage is applied to the grid, the area proximate their intersection will assume a net charge sufficient to attract or repel pigment particles in suspension in the dielectric fluid. Since numerous cathode and grid lines are employed, there are numerous discrete intersection points which can be controlled by varying the voltage on the cathode and grid elements to cause localized visible regions of pigment concentration and rarefaction. Essentially then, the operating voltages on both cathode and grid must be able to assume at least two states corresponding to a logical one and a logical zero. Logical one for the cathode may either correspond to attraction or repulsion of pigment. Typically, the cathode and grid voltages are selected such that only when both are a logical one at a particular intersection point, will a sufficient electrostatic field be present at the intersection relative to the anode to cause the writing of a visual bit of information on the display through migration of pigment particles. The bit may be erased, e.g., upon a reversal of polarity and a logical zero-zero state occurring at the intersection coordinated with an erase voltage gradient between anode and cathode. In this manner, digitized data can be displayed on the electrophoretic display.

An alternative EPID construction is described in U.S. Pat. No. 5,053,763, referred to above, which relates to an electrophoretic display in which the cathode/grid matrix as is found in triode-type displays is overlayed by a plurality of independent separately addressable "local" anode lines. The local anode lines are deposited upon and align with the grid lines and are insulated therefrom by interstitial lines of photoresist. The local anode lines are in addition to the "remote" anode, which is the layer deposited upon the anode faceplate or cap as in triode displays. The dual anode structure aforesaid provides enhanced operation by eliminating unwanted variations in display brightness between frames, increasing the speed of the display and decreasing the anode voltage required during Write and Hold cycles, all as explained in U.S. Pat. No. 5,053,763, which is incorporated herein by reference.

An examination of U.S. Pat. No. 5,053,763 reveals that the local anode structure employed therein is realized by applying a layer of photoresist over the grid elements, which are formed from a first metal, such as, chrome. A layer of a second metal, e.g., nickel or aluminum, is applied over the photoresist layer. Yet another layer of photoresist is applied over the second metal layer, and is then masked, exposed and developed in the same form as the grid elements. The second metal layer is then etched with a suitable solution. The photoresist between the first and second metal layers is then plasma etched. A layer of $SiO_2$ is then deposited over the resulting structure.

It is an object of the present invention to provide an alternative structure and method for making the remote anode/cathode/grid matrix than that shown in U.S. Pat. No. 5,053,763.

SUMMARY OF THE INVENTION

The problems and disadvantages associated with conventional electrophoretic displays are overcome by the present invention which includes in an electrophoretic display of the type having: a cathode matrix comprising a plurality of parallel lines arranged in a given direction, a grid matrix insulated from the cathode matrix and comprising a plurality of parallel lines each perpendicular to the cathode lines to form an X-Y addressing matrix, and a conventional anode electrode separated from the X-Y matrix, the space between the anode electrode and the X-Y matrix accommodating an electrophoretic dispersion including pigment particles suspended in a fluid; the improvement therewith of an additional anode electrode comprising a plurality of parallel lines each associated with and insulated from the grid lines. The additional anode electrode is disposed within a plane shared by the grid matrix and operates to control the path of the pigment particles to and from the X-Y matrix and to allow excess pigment to remain at the conventional anode electrode.

BRIEF DESCRIPTION OF THE FIGURES

For a better understanding of the present invention, reference is made to the following detailed description of an exemplary embodiment considered in conjunction with the accompanying drawings, in which.

DETAILED DESCRIPTION OF THE FIGURES

Figure 1:
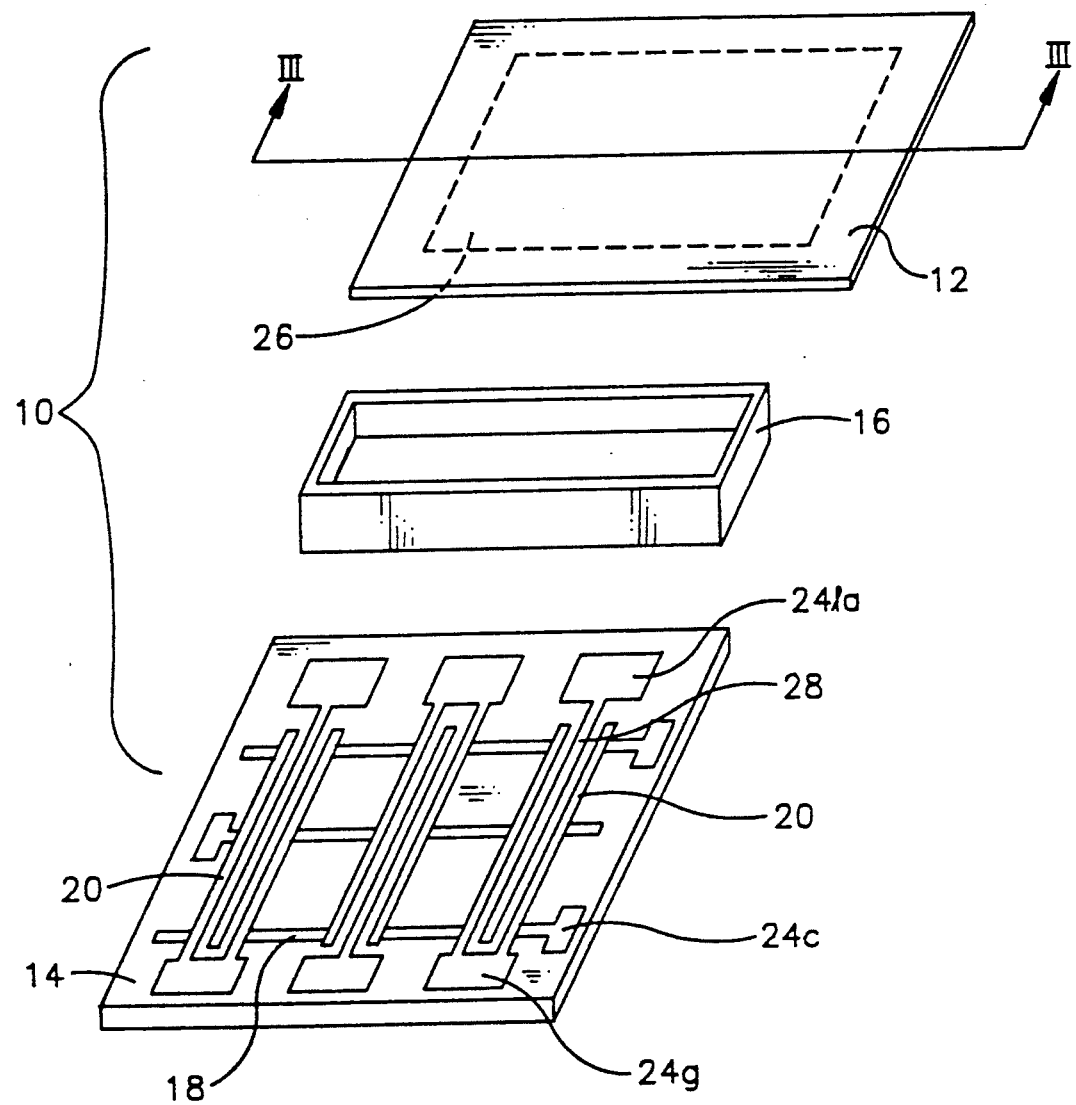
FIG. 1 is an exploded perspective view of an electrophoretic display in accordance with an exemplary embodiment of the present invention.

FIG. 1 shows an electrophoretic display 10 in accordance with the present invention. The display 10 has an anode faceplate 12 and a cathode faceplate 14 which are sealably affixed on either side of an interstitial spacer 16 to form a fluid-tight envelope for containing a dielectric/pigment particle suspension or electrophoretic fluid (not shown). The faceplates 12 and 14 are typically flat glass plates upon which are deposited conductor elements to comprise the situs of electrostatic charge for inducing motion in the electrophoretic fluid. The techniques, materials and dimensions used to form the conductor elements upon the faceplates and the methods for making EPIDS, in general, are shown in U.S. Pat. Nos. 4,655,897, 4,732,830 and 4,742,345 which patents are incorporated herein by reference.

In the invention, as depicted in FIG. 1, for example, a plurality of independent, electrically conductive cathode lines 18, shown here as horizontal rows, are deposited upon the cathode faceplate 14 using conventional deposition and etching techniques. Of course, the orientation of the cathode lines depends upon the orientation of the screen, which, if rotated 90 degrees, would position the cathode lines vertically, thus, the cathode lines are arbitrarily defined as horizontal. It is preferred that the cathode elements 18 be composed of Indium Tin Oxide (ITO) as set forth in U.S. Pat. No. 4,742,345. A plurality of independent grid conductor lines 20 are superimposed in the vertical over the cathode elements 18, i.e., at right angles thereto, and are insulated therefrom by an interstitial photoresist layer 22 (see FIG. 3). The grid elements 20 may be formed by coating the photoresist layer 22 with a metal, such as nickel, using sputtering techniques or the like, and then selectively masking and etching to yield the intersecting but insulated configuration shown in FIG. 1. Each cathode and grid element 18, 20 terminates at one end in a contact pad 24c and 24g, respectively, or is otherwise adapted to permit connection to display driver circuitry (not shown). An anode 26 is formed on an interior surface of the anode faceplate 12 by plating with a thin layer of conductor material, such as, chrome.

Whereas the foregoing components have been previously described in prior patents and applications of the present Applicants, the present invention includes a novel local anode 28 structure. As stated above, the benefits and operation of an EPID having a local anode have been recognized and described in U.S. Pat. No. 5,053,763 by the present Applicants. Previously, however, the local anode lines have been formed superimposed over and in alignment with the grid elements, and separated therefrom by an interstitial layer of photoresist insulation (see FIG. 5). In the present invention, the local anode 28 lines are formed at the same time, of the same material and in the same plane as the grid elements 20. This is accomplished by interleaving the local anode 28 and grid 20 elements. Thus, the mask that was used to form the plurality of grid lines has been altered such that a plurality of grid lines and a plurality of local anode lines are simultaneously formed by a single mask. After formation, a SiO$_2$ coating can be applied over the grid/local anode/cathode complex as set forth in U.S. Pat. No. 5,053,763. The display is also operated in the same fashion as in that application.

Figure 2:
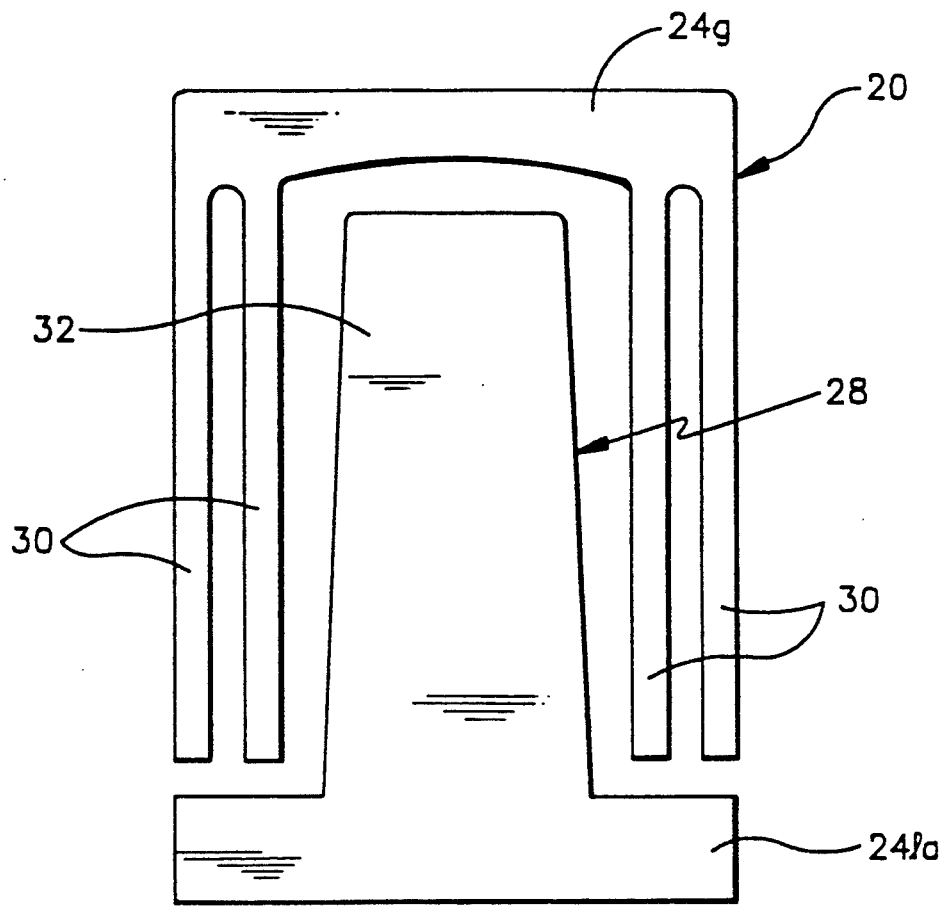
FIG. 2 is an enlarged plan view of a selected local anode element interleaved with a selected grid element in accordance with an exemplary embodiment of the present invention and as shown in FIG. 1.

FIG. 2 shows an exemplary configuration for a single grid line 20, a single local anode line 28 and their interleaving. As has been recognized previously, the configuration of the grid lines as a tined element, i.e., a element having a plurality of coextensive parallel forks 30 emanating from a common area, here the grid contact pad 24g, improves display brightness as described in U.S. Pat. No. 4,742,345. In the embodiment shown in FIG. 2, the local anode 28 is depicted as having a single elongated portion 32 emanating from a contact pad portion 241a. The elongated portion 32 of the local anode 28 extends between the forks 30 of the grid line 20, and, in this sense, interleaves with the grid line 20. It should be noted that the local anode 28 could also be provided with forks like those of the grid line 20, and in that event, the interleaving could be in the form of alternating grid and local anode forks. Indeed, any number of grid forks 30 (elongated portions) and local anode forks or elongated portions 32 could be employed. It is required, however, that they be insulated one from another, and, in order to provide a regular coordinate grid along with the cathode lines 18, should be substantially parallel to each other and perpendicular to the cathode lines 18. It is preferred that the local anode line 28 as shown in FIG. 2 have a width of approximately 30 microns, that a spacing of 12 microns separate the elongated portion 32 of the local anode 28 from the forks 30 of the grid line 20, and that the grid forks 30 be approximately 10 microns wide with an interfork spacing of 12 microns. These dimensions provide a local anode 28 which is wider than the grid forks 30 and which allows better pigment hiding than if the local anode were narrower. Overall, the interleaved grid and local anode elements configured according to these dimensions have an open area to closed area ratio of approximately 40%, which is within the range of normal triode EPIDS and a screen produced in accordance with these dimensions has a normal display brightness. Open area ratio should be in the range of 30% to 60% for adequate screen brightness.

To form an EPID 10 like that shown in FIG. 1, the parts may be assembled in a stack and placed in an oven for baking. The spacer 16, in that case, would be coated on surfaces which contact adjacent elements with a material which would become plastic at baking temperatures, such as, epoxy. Upon baking, the meltable material flows and the elements form a laminate upon cooling. Of course, other methods exist within the scope of the normally skilled artisan for assembling the elements of the EPID 10 shown, such as, e.g., gluing. The lamination of the EPID elements forms an envelope for containing the dielectric fluid/pigment particle suspension.

Figure 3:
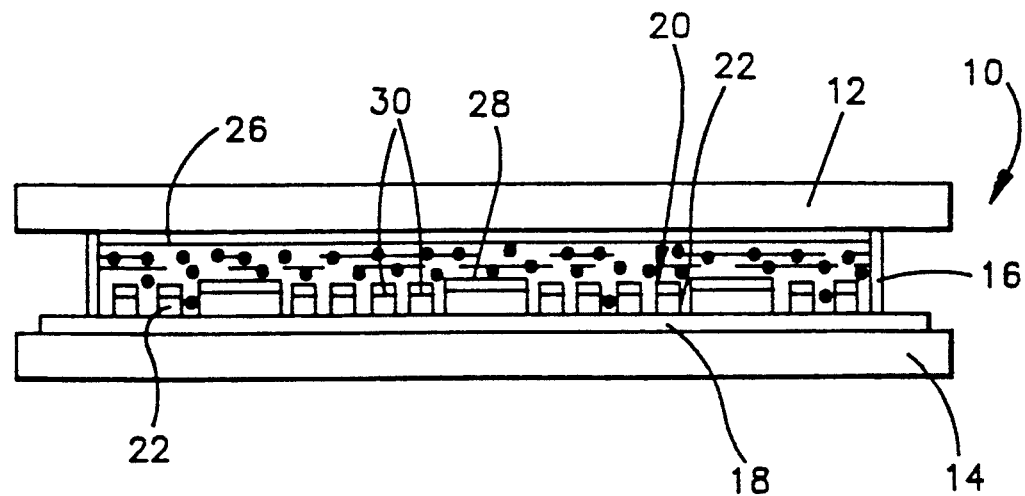
FIG. 3 is a cross-sectional view of the electrophoretic display shown in FIG. 1 in the unexploded state, taken along section line III—III and looking in the direction of the arrows.

FIG. 3 shows the electrophoretic display of FIG. 1 utilizing the interleaving configuration shown in FIG. 2 assembled and in cross-section. The anode 26 in the embodiment shown, is a plate-like area of conductor material having a length and width essentially matching that of the cathode/grid/local anode matrix, i.e., coextensive with the matrix, as is taught in the above referenced patents and applications of the present Applicant. Unlike previous teachings, the present invention has the local anode 28 elements deposited upon photoresist layer 22 in the same plane and by the same manufacturing step as the grid elements 20 (the individual forks 30 being shown in cross-section). Since all conductor elements are quite thin, they extend beneath the interstitial spacer 16 without special provision and at least one end thereof provides a terminal exterior to the envelope for connecting display driver circuitry (not shown).

The proportions of the grid and local anode lines as shown in FIGS. 1-3 have been distorted for the purposes of illustration, viz., the elongated portions would be long enough to extend substantially the entire height of the cathode faceplate 14, whereas the width of the individual lines would be small enough to accommodate in the order of 1,700 lines on an 8.5"×11" screen.; Thus, in real displays the grid and anode lines are very thin and elongated. A workable panel would have a large number of intersections, e.g., 2,200×1,700 or a total of 3,740,000 separately addressable intersection points. For ease of illustration, only a few cathode lines 18, grid lines 20, and local anode lines 28 are depicted. More illustrations of electrophoretic displays, their components and electrical circuitry can be seen by referring to U.S. Pat. Nos. 4,742,345 and 4,772,820, each being awarded to the inventors herein and which are incorporated by reference herein.

Figure 4:
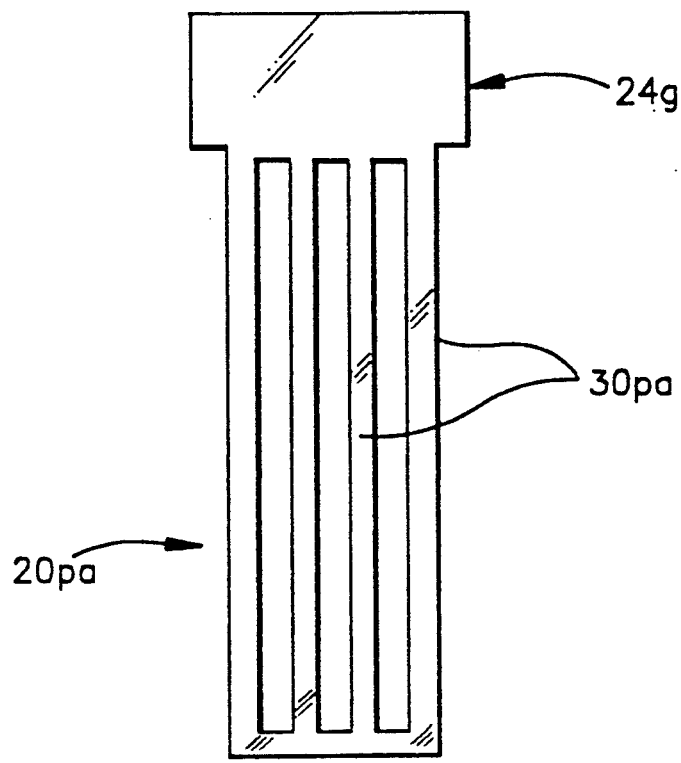
FIG. 4 is an enlarged plan view of a selected grid and/or local anode element structure as is taught in prior U.S. Pat. No. 5,053,763 filed by the inventors herein.
Figure 5:
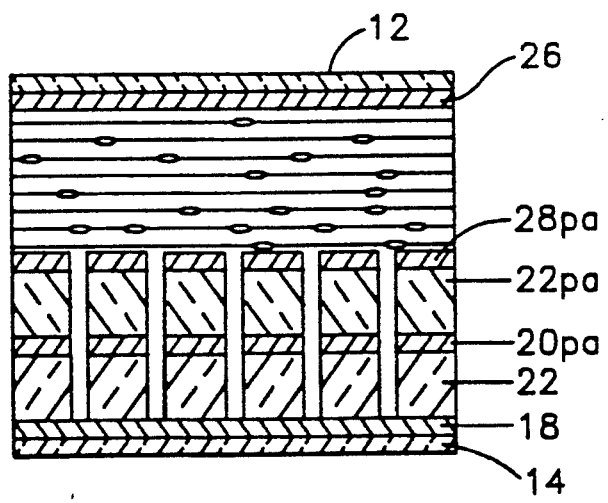
FIG. 5 is a cross-sectional fragmentary view of an electrophoretic display in accordance with U.S. Pat. No. 5,053,763 and which incorporates the element structure shown in FIG. 4.

FIGS. 4 and 5, are illustrations of certain features of EPIDS disclosed by the Applicants herein in U.S. Pat. No. 5,053,763 and are included for the purpose of providing a comparison to the present invention. Elements having essentially the same form and function as corresponding elements in the present invention are labelled with the same reference numerals. Common elements in the prior EPIDS which have been altered in the present invention are flagged by the suffix "pa". FIG. 4 illustrates the configuration for a tined grid (and local anode) element 20*pa* previously disclosed in U.S. Pat. No. 5,053,763. On comparison to the grid element 20 configuration taught by the present invention, it should be observed that, while the tined configuration is retained, a spacing must be provided centrally to accommodate the interleaved anode line.

FIG. 5 illustrates the stacking of the local anode elements 28*pa* upon the grid elements 20*pa* previously used by the applicants in EPIDS having a remote and a local anode. It should be appreciated that this stacking configuration is done in several steps and that the local anode 28*pa* must be closely aligned with the grid elements 20*pa* for effective operation. The present invention has neither of these requirements. Another difference between the present invention and that shown in FIG. 5 is that the local anode 28 of the present invention alters the distribution of pigment particles in the plane of the grid and the local anode. In contrast, in the device shown in FIG. 5, the local anode effects pigment concentration at the grid by drawing it into a plane removed from the grid.

It should be understood that the embodiments described herein are merely exemplary and that a person skilled in the art may make many variations and modifications without departing from the spirit and scope of the invention as defined in the appended claims.

We claim:

1. A method for fabricating the cathode/grid/local anode matrix on the cathode faceplate of a dual anode electrophoretic display comprises performing, in substantially the order shown, the steps of:
   (a) forming a plurality of cathode lines on said cathode faceplate;
   (b) depositing a first layer of photoresist over said cathode lines;
   (c) coating said first layer of photoresist with a conductor material;
   (d) coating said conductor material with a second layer of photoresist;
   (e) masking said second layer of photoresist with a mask corresponding to the shape of a plurality of grid lines interleaved with a plurality of local anode lines;
   (f) exposing said second layer of photoresist through said mask;
   (g) developing said second layer of photoresist
   (h) acid etching said conductor material coating where not covered by said second layer of photoresist remaining after developing; and
   (i) plasma etching said first and said second layers of photoresist where not covered by said conductor material remaining after said step of acid etching.

2. The method of claim 1, further including the step of applying a $SiO_2$ coating over said cathode/grid/local anode matrix after said step of plasma etching.

3. The method of claim 2, wherein said step of coating with a conductor material includes sputtering a layer of chrome upon said first layer of photoresist.

4. The method of claim 2, wherein said step of coating with a conductor material includes sputtering a layer of aluminum upon said first layer of photoresist.

5. A method for manufacturing a dual anode electrophoretic display comprising the steps of:
   providing a cathode faceplate having a plurality of parallel, electrically conductive cathode lines formed thereon;
   coating said cathode liens at selected intervals with a layer of insulating material;
   simultaneously forming from a single layer of conductive material a plurality of interleaved electrically conductive grid lines and local anode lines over said cathode liens such that said grid lines and said local anode lines are insulated form each other and from said cathode lines.

6. The method of claim 5, wherein said forming step comprises:
   coating said layer of insulating material with a conductor material;
   coating said layer of conductor material with a second layer of insulating material; and
   selectively etching said conductive layer and said second layer to define said interleaved grid and local anode lines.

7. The method of claim 6, wherein said first and second insulating layers comprise photoresistive material.

8. The method of claim 6, further including masking said second layer with a mask corresponding to the shape of said grid lines interleaved with said local anode liens prior to said etching step.

9. The method of claim 8, further comprising developing said second layer through said mask.

10. The method of claim 9, wherein said etching step comprises acid etching areas of said conductive layer not covered by said second layer after said developing step.

11. The method of claim 10, wherein said etching step further comprises plasma etching areas of said first and second layers of insulating material not covered by conductive material after said step of acid etching.

12. The method of claim 5, further including the step of applying a coating of silicon dioxide over said interleaved grid and local anode lines.

13. The method of claim 5, wherein said grid liens and said local anode lines are arranged at right angles relative to said cathode lines.

* * * * *